US011249053B2

(12) United States Patent
Lepage

(10) Patent No.: US 11,249,053 B2
(45) Date of Patent: Feb. 15, 2022

(54) ULTRASONIC INSPECTION CONFIGURATION WITH BEAM OVERLAP VERIFICATION

(71) Applicant: OLYMPUS AMERICA INC., Center Valley, PA (US)

(72) Inventor: Benoit Lepage, Quebec (CA)

(73) Assignee: Olympus America Inc., Center Valley, PA (US)

( * ) Notice: Subject to any disclaimer, the term of this patent is extended or adjusted under 35 U.S.C. 154(b) by 0 days.

(21) Appl. No.: 16/657,076

(22) Filed: Oct. 18, 2019

(65) Prior Publication Data

US 2020/0049670 A1    Feb. 13, 2020

Related U.S. Application Data

(63) Continuation of application No. 15/429,700, filed on Feb. 10, 2017, now abandoned.

(51) Int. Cl.
| | | |
|---|---|---|
| *G01N 29/30* | (2006.01) | |
| *G01N 29/26* | (2006.01) | |
| *G01N 29/44* | (2006.01) | |
| *G01N 29/04* | (2006.01) | |

(52) U.S. Cl.
CPC .......... *G01N 29/30* (2013.01); *G01N 29/043* (2013.01); *G01N 29/262* (2013.01); *G01N 29/4427* (2013.01)

(58) Field of Classification Search
CPC .. G01N 29/30; G01N 29/262; G01N 29/4427; G01N 29/043
USPC ................ 73/1.86, 1.82, 597, 598, 620–631; 702/94, 95, 103, 104, 97
See application file for complete search history.

(56) References Cited

U.S. PATENT DOCUMENTS

| | | |
|---|---|---|
| 5,533,401 A | 7/1996 | Gilmore |
| 9,625,424 B2 | 4/2017 | LePage et al. |
| 2015/0168355 A1 | 6/2015 | Habermehl et al. |
| 2015/0377840 A1 | 12/2015 | Zhang et al. |
| 2016/0238566 A1 | 8/2016 | Lepage et al. |

(Continued)

OTHER PUBLICATIONS

"U.S. Appl. No. 15/429,700, Corrected Notice of Allowability dated Sep. 11, 2019", 2 pgs.

(Continued)

*Primary Examiner* — Robert R Raevis
(74) *Attorney, Agent, or Firm* — Schwegman Lundberg & Woessner, P.A.

(57) ABSTRACT

Disclosed is a beam overlap verification system and method for phased array ultrasonic inspection. A scan plan for the ultrasonic inspection defines a suitable probe, wedge and calibration block having machined defects for the geometry to be inspected, and makes a beam definition which defines a set of ultrasonic beams emitted by the phased array. An intersection amplitude unit records the response amplitudes from each defect at predetermined intersection points of adjacent beam pairs as the probe and wedge are manually scanned across the calibration block. An overlap verification module determines the −6 dB overlap of all adjacent beam pairs which are relevant to the geometry to be inspected, and verifies that the beam overlap conforms to the required coverage according to the ASME or other relevant codes. In this way, coverage is experimentally verified during calibration prior to inspection of a known geometry, such as a weld.

19 Claims, 5 Drawing Sheets

(56) References Cited

U.S. PATENT DOCUMENTS

2018/0231508 A1  8/2018  Lepage

OTHER PUBLICATIONS

"U.S. Appl. No. 15/429,700, Examiner Interview Summary dated Apr. 16, 2019", 3 pgs.
"U.S. Appl. No. 15/429,700, Examiner Interview Summary dated Jul. 5, 2019", 4 pgs.
"U.S. Appl. No. 15/429,700, Final Office Action dated May 23, 2019", 8 pgs.
"U.S. Appl. No. 15/429,700, Non Final Office Action dated Nov. 14, 2018", 9 pgs.
"U.S. Appl. No. 15/429,700, Notice of Allowance dated Jul. 19, 2019", 7 pgs.
"U.S. Appl. No. 15/429,700, Response filed May 14, 2019 to Non Final Office Action dated Nov. 14, 2018", 21 pgs.
"U.S. Appl. No. 15/429,700, Response filed Jul. 3, 2019 to Final Office Action dated May 23, 2019", 12 pgs.

ULTRASONIC INSPECTION CONFIGURATION WITH BEAM OVERLAP VERIFICATION

CROSS-REFERENCE TO RELATED APPLICATION

This application is a Continuation of U.S. patent application Ser. No. 15/429,700 entitled "AN IMPROVED ULTRASONIC INSPECTION CONFIGURATION WITH BEAM OVERLAP VERIFICATION" filed on Feb. 10, 2017 the entire teachings of which application are incorporated herein by reference in their entirety.

FIELD OF THE INVENTION

The present disclosure generally relates to a method and a system for conducting non-destructive testing/inspection (NDT/NDI) by phased array ultrasonic testing (PAUT), and more particularly to a system and method of creating a scan plan with validation of the overlap of ultrasonic beams of a PAUT configuration.

BACKGROUND OF THE INVENTION

Phased array ultrasonic testing (PAUT) is an advanced method of ultrasonic testing that has applications in industrial non-destructive testing (NDT). Common applications are to find flaws in manufactured materials such as welds.

Single-element (non-phased array) probes, known technically as monolithic probes, emit a beam in a fixed direction. To test a large volume of material, a conventional probe must be physically moved or turned to sweep the ultrasonic beam through the area of interest.

In contrast, the beam from a PAUT probe can be moved electronically, without moving the probe, and can be swept through a wide volume of material at high speed. The beam is controllable because a PAUT probe is made up of multiple small elements, each of which can be pulsed individually at a computer-calculated timing, forming incidence angles. The term phased refers to the timing, and the term array refers to the multiple elements. The element that contributes to a beam formation is defined as the aperture of the beam; the aperture can include a portion or all of the elements of the PAUT probe.

During typical inspections of welds, multiple ultrasound beams are generated from a single or multiple apertures at various incidence angles. These generate an image showing reflections (or diffractions) of the ultrasonic waves that are associated to defects within the scanned area in the test object. For weld inspection, the area of interest, or the scanned area, is usually the weld and its surrounding area. For cases where the aperture is fixed and only the angles are changed, the images are called a sectorial scan or S-scan. For cases where the angle is fixed and only the aperture is moved, the images are called a linear scan or E-scan.

One of the requirements for having appropriate coverage of the weld area in a PAUT inspection is that there should be sufficient overlap between adjacent ultrasound beams which are generated by the PAUT probe at various incidence angles. According to an international code "2010 ASME Boiler & Pressure Vessel Code", 2010 Edition, Article #4, Mandatory Appendices V—Nondestructive Examination, paragraph V-471.1, (hereinafter referred to as "the code") there is a required minimum overlap between adjacent beams in order for the PAUT inspection to have valid coverage.

As described in co-pending patent application Ser. No. 14/621,906, generation of the multiple ultrasound beams may be designed according to a scan plan which defines the combination of:
a. instrumentation configuration including the probe, wedge, and acquisition unit;
b. acoustic settings, including the aperture size and position, the focalization setting, the beam angles and the gating parameters;
c. guidelines for mechanical scanning of the probe, including probe to weld distance and maximum scan speed.

Application Ser. No. 14/621,906 states that the scan plan must define a beam configuration that always meets or exceeds the overlap requirement within a relevant depth range. However, there is no mention of any method to validate experimentally that the overlap requirement is met by all adjacent beams. There is therefore no way to verify that the requirements of the code for beam overlap are actually being met during any given inspection.

SUMMARY OF THE INVENTION

A general purpose of the invention is to provide a method of validating the overlap of all relevant adjacent beams in a PAUT configuration.

The method takes advantage of the fact that prior to any inspection, the PAUT configuration must be calibrated by scanning the probe and wedge on a calibration block having side-drilled holes (SDH) at depths appropriate to the expected depth of inspection in an actual test object. The purpose of the calibration is generally to set up the angle corrected gain (ACG) and/or time corrected gain (TCG) parameters for the particular configuration. However, the data obtained may also be used to provide verification of the actual overlap of all relevant adjacent beams, rather than relying on a calculated overlap from the scan plan. An advantage of the present invention is that the same data acquired for the TCG/ACG calibration may be used for verification of the overlap according to the present disclosure.

During calibration, the beam response is usually acquired without an encoder system, and in a relatively chaotic way. The user typically moves the probe back and forth until the amplitude envelope is smooth—for a sector scan, this means that there is a relatively continuous amplitude response between consecutive angles. Because the data is acquired in such a manner, any method used to extract useful overlap information from the data must be independent of the particular sequence of data acquisition.

The overlap verification apparatus and method of the present disclosure is based on predetermined relationships between the overlap percentage of adjacent beams and intersection amplitudes of adjacent plots of response amplitude vs probe scan position. These predetermined relationships are used to verify that the overlap percentage of the adjacent beams at a code specified amplitude drop (usually −6 dB) is greater than a predetermined threshold as specified by the relevant code.

DETAILED DESCRIPTION OF PREFERRED EMBODIMENT

Figure 1:
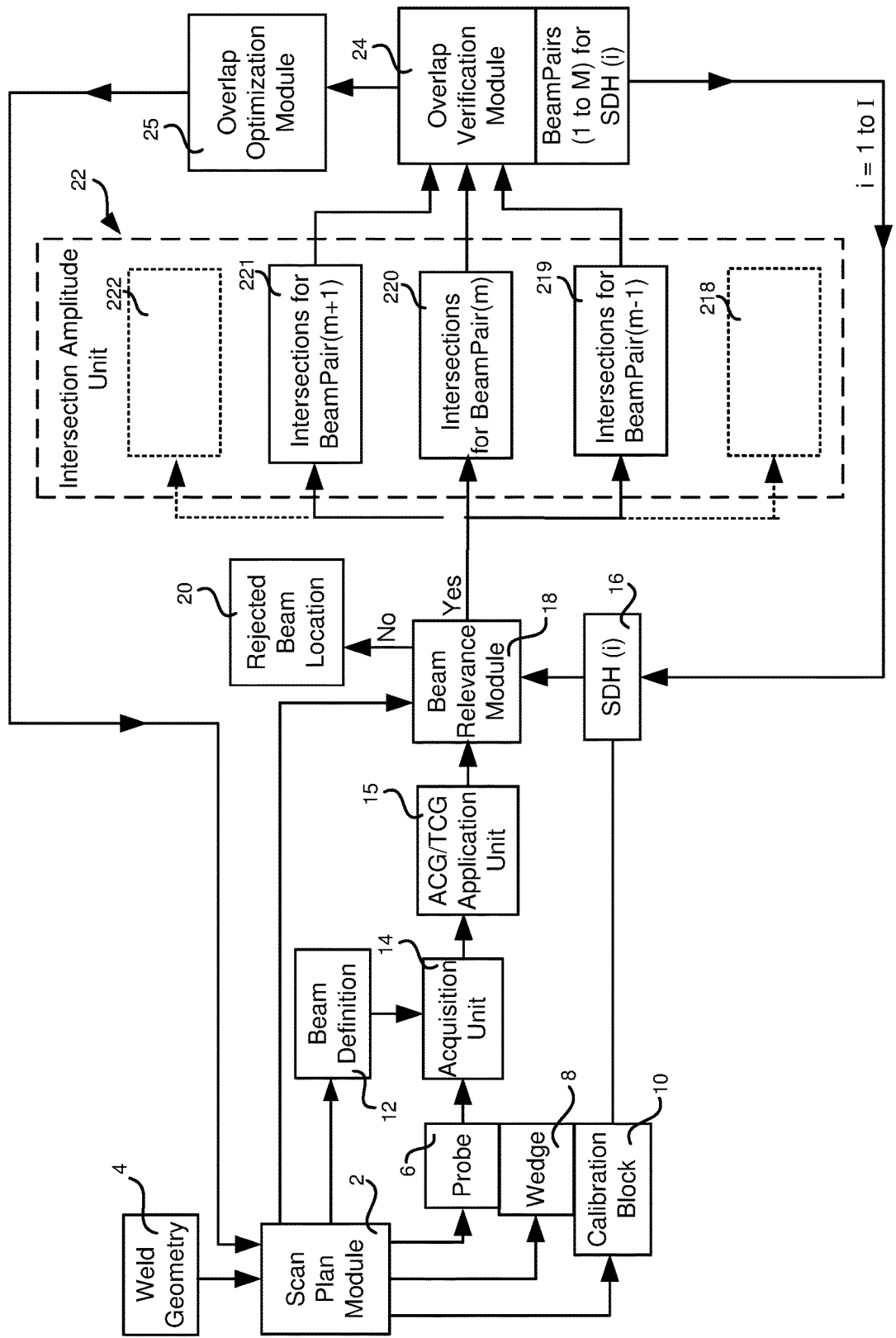
FIG. 1 is a schematic flow chart of an overlap verification system and method according to the present disclosure.

FIG. 1 shows a schematic flow chart of the overlap verification process during a calibration, which is to be carried out with prior knowledge of the actual geometry for a subsequent measurement on a test object 28. In order to provide suitable ultrasonic beams, a scan plan module 2, having information about a weld geometry 4, is used to generate a beam definition 12, which comprises a definition of N ultrasonic beams having M pairs of adjacent beams. Scan plan module 2 further defines a suitable probe 6, a wedge 8 and a calibration block 10. While probe 6 is generating ultrasonic beams according to scan plan module 2, probe 6 and wedge 8 are manually scanned on the surface of calibration block 10. Acoustic response signals received by probe 6 are directed to a data acquisition unit 14 where the signals are digitized. ACG and TCG calibrations are applied to the digital data by an ACG/TCG application unit 15, and the calibrated data is passed to a beam relevance module 18. Calibration block 10 includes a number I of side drilled holes, designated SDH(1), SDH(2) . . . SDH(I). Beam relevance module 18 receives information via scan plan module 2 about each side drilled hole SDH(i) 16, where i=1, 2 . . . I, wherein each side drilled hole 16 is at a different depth below the surface of calibration block 10.

Based on information about weld geometry 4, beam definition 12 and side drilled hole SDH(i) 16, beam relevance module 18 makes a determination as to whether a particular response from probe 6 is or is not relevant. During calibration, a relevant response is defined as one which emanates from a relevant area 38 of calibration block 10 as described below in relation to FIG. 2B. Relevant area 38 as shown in FIG. 2B is directly related to weld geometry 4 to be used in a subsequent measurement on test object 28. Beam relevance module 18 directs probe response signals which are not relevant to a rejected beam location 20, and such beams receive no further consideration. Relevant beams are directed to an intersection amplitude unit 22, which determines intersection amplitudes between each adjacent pair of relevant beams.

Relevant beam pairs are designated BeamPair(1), BeamPair(2) . . . BeamPair(M), where M is the total number of relevant beam pairs with respect to the $i^{th}$ side drilled hole, SDH(i). For each relevant beam pair, intersection amplitude unit 22 determines amplitudes of a set of intersection points as described below in connection with FIG. 4. The intersection amplitudes for each beam pair are designated Intersections for BeamPair(1), Intersections for BeamPair(2) . . . Intersections for BeamPair(M). In FIG. 1, a set of Intersections for BeamPair(m) 220 is shown in intersection amplitude unit 22, together with intersection amplitudes from neighboring beam pairs, namely Intersections for BeamPair(m−1) 219 and Intersections for BeamPair(m+1) 221. It is to be understood that intersection amplitudes for all M relevant beam pairs are determined by intersection amplitude unit 22, and intersections 218 and 222 are shown in dotted lines to represent all the remaining sets of intersection amplitudes within intersection amplitude unit 22.

Intersection amplitudes for all relevant beam pairs are directed from intersection amplitude unit 22 to an overlap verification module 24, which performs an overlap verification of each of the beam pairs, with respect to side drilled hole SDH(i) 16. Overlap verification is performed by measuring the overlap of each relevant beam pair according to the methods which are described below in connection with FIGS. 3-5, and then comparing each measurement with a minimum overlap specified in the relevant code. Having completed verification for all M beam pairs with respect to the $i^{th}$ side drilled hole, SDH(i) 16, the value of i is incremented, a new set of relevant beams is obtained from beam relevance module 18, new sets of intersection points are derived for each beam pair by intersection amplitude unit 22, and overlap verification module 24 repeats verification of all new relevant beam pairs for a different side drilled hole.

In this way, overlap is verified for the entire set of beams relevant to the measurement, for different depths corresponding to the different depths of the side drilled holes, SDH(i) 16, in the calibration block.

It should be noted that the notion of "BeamPair(m)" refers to the pairing of any beam (n), where n=1 to N, with at least one adjacent beam, namely beam(n−1) or beam(n+1). Consequently, the parameter "maximum amplitude" corresponds to a specific beam(n). Similarly "intersection amplitude" corresponds to an amplitude acquired where there is a known relationship between adjacent beams that provides a known beam overlap between a specific beam(n) reflected from the selected defect and reflections of the at least one adjacent beam(n−1) and/or beam(n+1).

If the overlap measured by overlap verification module 24 is greater than the minimum overlap specified in the code for all beam pairs and for all depths of the side drilled holes, then the verification is complete and the code is satisfied. If, however, the overlap measured by overlap verification module 24 is less than the minimum overlap specified in the code for some or all of the relevant beam pairs, then an overlap optimization module 25 may optionally communicate with scan plan module 2 to increase the angular density of beams generated by probe 6. On the other hand, if the overlap measured by overlap verification module 24 is much greater than the minimum overlap specified in the code for some or all of the relevant beam pairs, then overlap optimization module 25 may optionally communicate with scan plan module 2 to reduce the angular density of beams generated by probe 6, thereby reducing the total number of beams N so that the overall testing time is reduced while still satisfying the code overlap criterion.

Figure 2A:
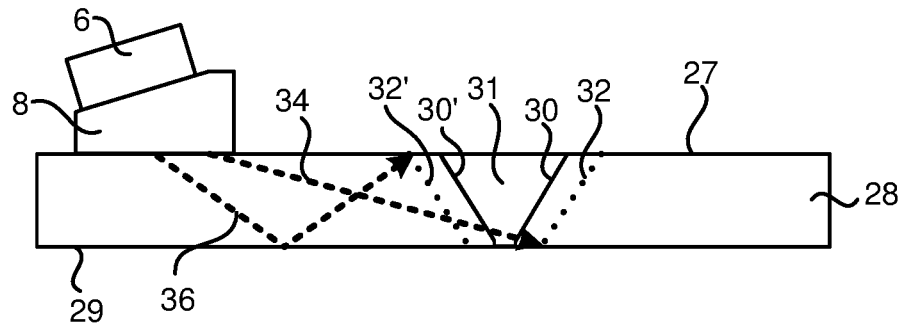
FIG. 2A is a schematic view of ultrasonic beams intersecting with a weld.
Figure 2B:
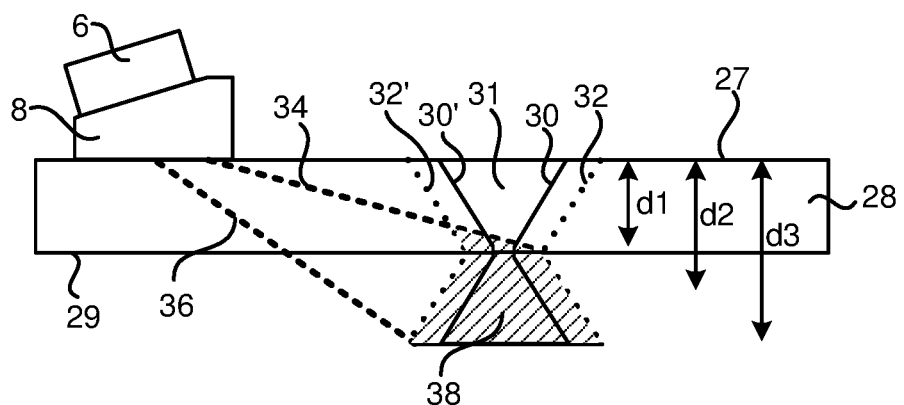
FIG. 2B shows the same schematic view as in FIG. 2A, but with multiple reflections illustrated through mirror images.

FIG. 2A shows a schematic view of ultrasonic beams intersecting with a weld 31 in test object 28 having an upper surface 27 and a lower surface 29. Weld 31 has weld bevel interfaces 30 and 30', and heat affected zone (HAZ) boundaries 32 and 32'. The limits of relevant beams for inspecting weld 31 are represented by a first line 34 which intersects HAZ boundary 32 at its intersection point with lower surface 29, and a second line 36 which reflects from lower surface 29 and then intersects HAZ boundary 32' at its intersection point with upper surface 27.

FIG. 2B shows the same geometry as FIG. 2A, but, for simplicity of viewing, reflections from lower surface 29 are illustrated by mirror images of weld 31, line 36 and upper surface 27. Use of such mirror images is common practice in PAUT NDT. FIG. 2B illustrates the definition of relevant area 38 which is shown shaded and is bounded by first line 34 and mirror images of second line 36, upper surface 27 and HAZ boundaries 32 and 32'. Also shown are three depths, d1, d2 and d3, approximately representing the top, middle and bottom respectively of relevant area 38. These are the depths of three side drilled holes in a calibration block 10a which is suitable for calibration prior to NDT inspection of weld 31, and which is illustrated in FIG. 3.

Figure 3:
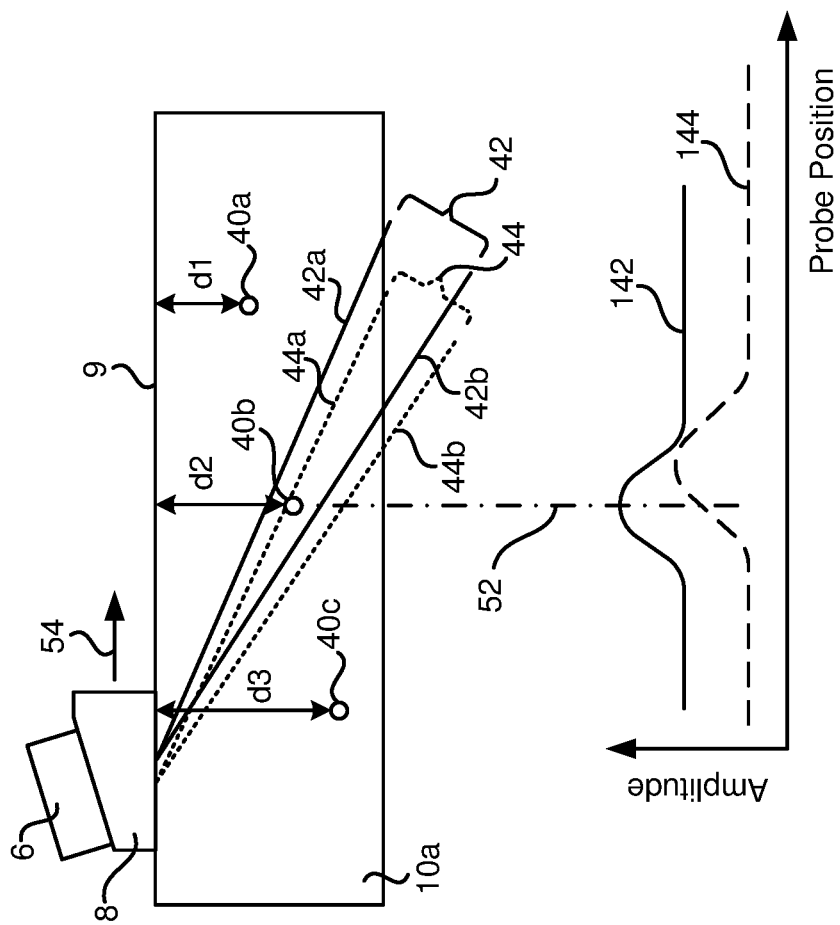
FIG. 3 is a schematic illustration of a probe and wedge scanning on a calibration block, showing two ultrasonic beams and their respective beam response amplitudes vs scan position.

FIG. 3 shows calibration block 10a having three side drilled holes 40a, 40b and 40c at depths d1, d2 and d3 respectively. Two adjacent ultrasonic beams, 42 and 44 are shown emerging from probe 6 and wedge 8. Beams 42 and 44 each have an angular width which is represented by beam boundaries 42a, 42b and 44a, 44b respectively. It is to be understood that beam boundaries 42a and 42b represent a drop of beam intensity of −6 dB from the maximum intensity of beam 42 at its center, and beam boundaries 44a and 44b represent a drop of beam intensity of −6 dB from the maximum intensity of beam 44 at its center.

Probe 6 and wedge 8 are manually scanned along an upper surface 9 of calibration block 10a in the direction illustrated by arrow 54. During scanning, beams 42 and 44 intersect side drilled hole 40b with varying intensity, and therefore there is a varying amplitude of the response signal as a function of the probe position. A first beam amplitude plot 142 is a plot of probe response amplitude vs scanning position for beam 42 reflected from SDH 40b. A second beam amplitude plot 144 is a plot of response amplitude vs scanning position for beam 44 reflected from SDH 40b. At the particular scanning position shown in FIG. 3, beam 42 intersects SDH 40b near to its maximum amplitude, and this is shown by the intersection of a line 52 with beam amplitude plot 142. On the other hand, beam 44 intersects SDH 40b close to boundary 44a, where the amplitude of beam 44 is considerably below its maximum amplitude, and this is shown by the intersection of line 52 with beam amplitude plot 144.

It should be noted that beam amplitude plots 142 and 144 are not actually available to acquisition unit 14 because acquisition unit 14 can only measure response amplitudes while, in the absence of a position encoder, probe positions are unknown. Therefore, beam amplitude plots 142 and 144 serve only as representations of the amplitude responses which are useful in describing the present invention.

It should also be noted that data similar to beam amplitude plots 142 and 144 may be obtained for all relevant beams emanating from probe 6 and wedge 8.

Note also that the data in beam amplitude plots such as 142 and 144 are acquired after the application of an ACG/TCG post processing algorithm, in which amplitude of response from a SDH is calibrated to be the same for all beam angles and all SDH depths.

Figure 4:
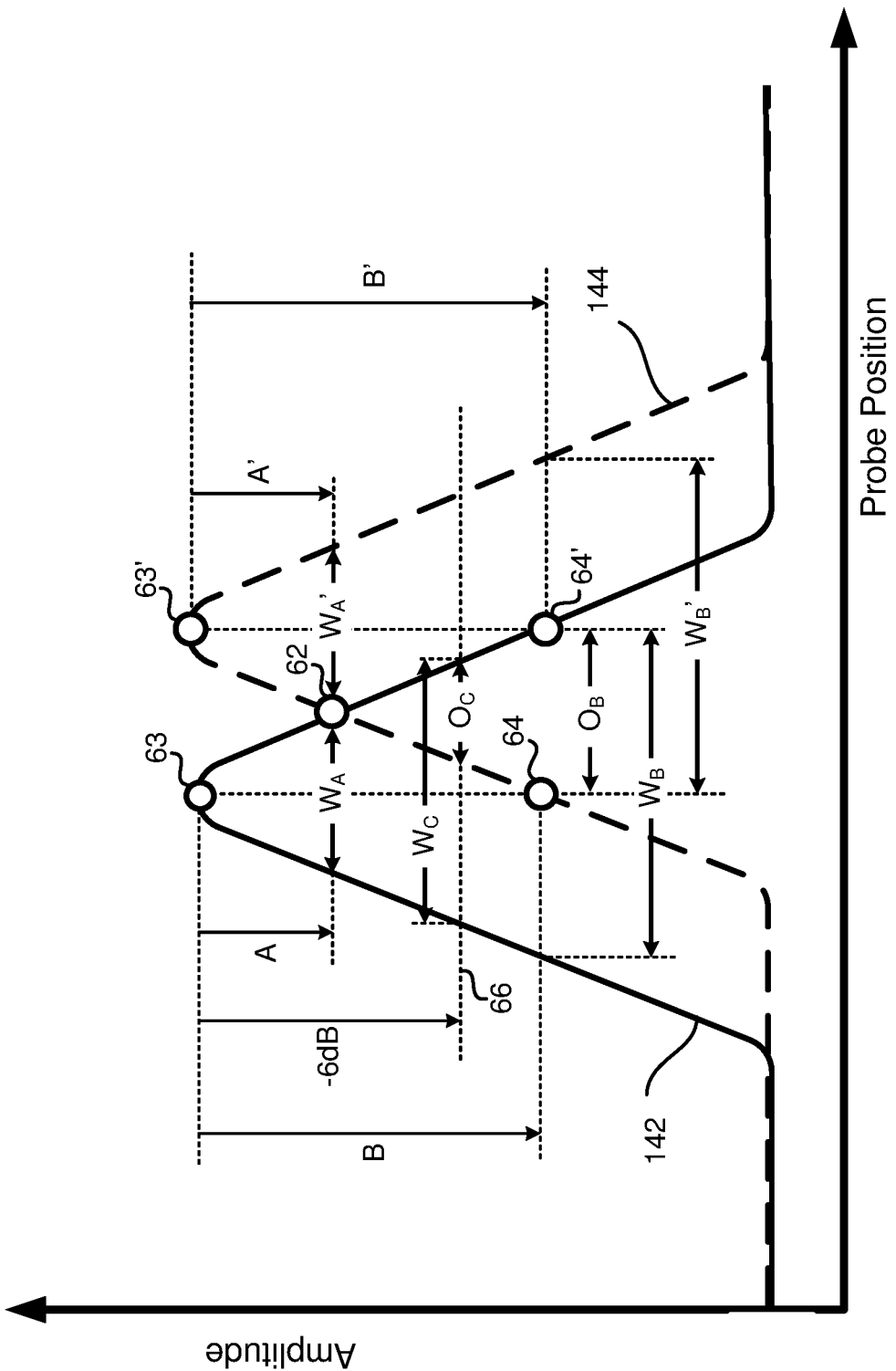
FIG. 4 is a diagram illustrating intersection amplitudes and overlap percentages determined according to the present disclosure.

FIG. 4 shows beam amplitude plots 142 and 144, representing adjacent beams 42 and 44 as shown in FIG. 3. Since beams 42 and 44 are adjacent and angle corrected, they may be represented without major error by plots 142 and 144 which have the same amplitude and shape. As described above, plots 142 and 144 are not available to acquisition unit 14. However, for each pair of adjacent beams, intersection amplitude unit 22 has access to the response amplitudes at a set of intersection points, namely intersection points 62, 63, 63', 64 and 64'. During the scanning operation of probe 6, the amplitudes at points 63 and 63' may be measured at the positions of probe 6 which give the maximum response amplitudes for beams 142 and 144 respectively due to calibration defect 40b. The amplitude at intersection point 64 may then be measured as the response amplitude for beam 144 while probe 6 is in the position at which the response amplitude for beam 142 is at its maximum value. Similarly, the amplitude at intersection point 64' may be measured as the response amplitude for beam 142 while probe 6 is in the position at which the response amplitude for beam 144 is at its maximum value. The reduction in response amplitude at intersection point 64 relative to the maximum amplitude at intersection point 63 is represented by an amplitude reduction B, and the reduction in response amplitude at intersection point 64' relative to the maximum amplitude at intersection point 63' is represented by an amplitude reduction B'. Amplitude reductions B and B' are conventionally measured in dB, but any other form of relative measurement may be used.

The amplitude at intersection point 62 may be measured by finding a location of probe 6 at which the response amplitudes of beams 142 and 144 are equal. The reduction in response amplitude at intersection point 62 relative to the maximum amplitude at intersection point 63 is represented by an amplitude reduction A, and the reduction in response amplitude at intersection point 62 relative to the maximum amplitude at intersection point 63' is represented by an amplitude reduction A'. Amplitude reductions A and A' are conventionally measured in dB, but any other form of relative measurement may be used.

Note that, if the assumption that amplitude plots 142 and 144 have the same amplitude and shape holds strictly true, then amplitude reductions A and A' would be equal, and amplitude reductions B and B' would also be equal. However, taking into account discrepancies in the assumption of equal amplitude and shape, the most conservative strategy is to measure both amplitude reductions and to use the maximum amplitude reductions $A_0$ and $B_0$ for further calculations, wherein:

$$A_0 = \max(A, A') \qquad (1)$$

$$B_0 = \max(B, B') \qquad (2)$$

It should be noted that the measured amplitudes at intersection points 62, 63, 63', 64 and 64' are stored in intersection amplitude unit 22. For example, if beams 42 and 44 are represented by BeamPair(m), then measured amplitudes at intersection points 62, 63, 63', 64 and 64' are stored in Intersections for BeamPair(m) 220 as shown in FIG. 1. The amplitudes at intersection points for all relevant beam pairs are passed to overlap verification module 24, which calculates amplitude reductions $A_0$ and $B_0$ and then verifies the overlap of beams 42 and 44, and all other relevant beam pairs, as described below.

Continuing to refer to FIG. 4, it can be seen that at the amplitude of intersection point 64 the width of amplitude plot 142 is $W_B$. Similarly, at the amplitude of intersection point 64' the width of amplitude plot 144 is $W_B'$. Amplitude plots 142 and 144 overlap by an amount $O_B$, and the overlap percentage between beams 42 and 44 at the amplitude of intersection points 64 and 64' is defined as:

$$\text{Overlap}_B = O_B/W_B = O_B/W_B' \qquad (3)$$

Note that, under the assumption that amplitude plots 142 and 144 have the same amplitude and shape, it may also be assumed that $W_B = W_B'$ and moreover, by symmetry, it can be seen that:

$$\text{Overlap}_B = 50\% \qquad (4)$$

Still referring to FIG. 4, it can be seen that at the amplitude of intersection point 62 the width of amplitude plot 142 is $W_A$, and at the amplitude of intersection point 62' the width of amplitude plot 144 is $W_A'$. However, there is zero overlap between amplitude plots 142 and 144 at the amplitude of intersection points 64 and 64', and therefore the overlap percentage is given by:

$$\text{Overlap}_A = 0\% \qquad (5)$$

Thus it may be seen that amplitude reduction $A_O$ corresponds to an overlap percentage of 0% and amplitude reduction $B_O$ corresponds to an overlap percentage of 50%. Also shown in FIG. 4 is a line 66 corresponding to an amplitude drop of −6 dB which may be specified by the relevant inspection code. At the −6 dB amplitude drop, the beam width is $W_C$, the overlap amount is $O_C$ and the overlap percentage is $\text{Overlap}_C = O_C/W_C$. In general, the minimum value of $\text{Overlap}_C$ is specified in the relevant inspection code, and it is a purpose of the present disclosure to determine the overlap percentage between beams 42 and 44 at −6 dB amplitude drop and to compare that overlap percentage with $\text{Overlap}_C$.

Note that an amplitude drop of −6 dB in the relevant inspection code is used only by way of example. Any specified amplitude drop in the code may be used, and all specified amplitude drops in the code are within the scope of the present disclosure.

Note also that in FIG. 4 the −6 dB amplitude drop is shown to be less than amplitude drop $B_O$ but greater than amplitude drop $A_O$. This is commonly the case, but is not a requirement. The −6 dB amplitude drop may be greater than amplitude drop $B_O$ or less than amplitude drop $A_O$.

Figure 5:
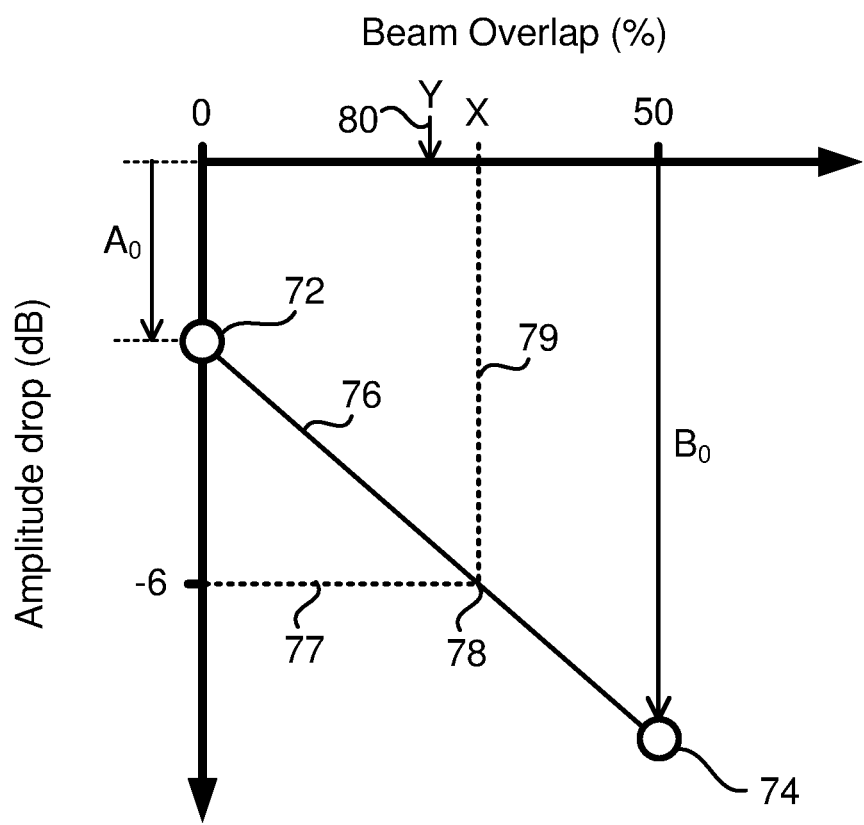
FIG. 5 is a graph of amplitude drop vs beam overlap according to the present disclosure.

FIG. 5 is a graph of amplitude drop plotted against beam overlap percentage. In accordance with the measurements described in connection with FIG. 4, a point 72 on the graph represents measurement of amplitude drop $A_O$ at a beam overlap of 0%, and a point 74 on the graph represents measurement of amplitude drop $B_O$ at a beam overlap of 50%. An interpolation line 76 represents an interpolation between points 72 and 74. The interpolation shown in FIG. 5 is linear, but any functional interpolation is within the scope of the present invention. For example, interpolation line 76 may be a non-linear interpolation based on computer modeling of beams 42 and 44. A horizontal line 77 is drawn at the level of −6 dB amplitude drop according to the code and intersects interpolation line 76 at a point 78. A vertical line 79 is drawn from point 78 and intersects the beam overlap axis at a beam overlap value of X %, which is the value of overlap at −6 dB between beams 42 and 44 measured according to the present disclosure. Also shown in FIG. 5 is an arrow 80 representing a beam overlap value of Y %, which is the minimum overlap value at −6 dB according to the inspection code.

It is the function of overlap verification module 24 (see FIG. 1) to verify that the measured overlap X % at −6 dB is greater than the code specified overlap Y % for all adjacent beam pairs within relevant area 38. If the measured overlap X % at −6 dB is less than the code specified overlap Y % for some or all of the relevant beam pairs, then overlap optimization module 25 may optionally communicate with scan plan module 2 to increase the angular density of beams generated by probe 6. If, on the other hand, the measured overlap X % at −6 dB is much greater than the code specified overlap Y % for some or all of the relevant beam pairs, then overlap optimization module 25 may optionally communicate with scan plan module 2 to reduce the angular density of beams generated by probe 6, thereby reducing the total number of beams N so that the overall testing time is reduced while still satisfying the code overlap criterion.

It should be noted that an important novel aspect of the present disclosure is to utilize the unique relationship between beam overlap and the intersection amplitudes of two adjacent beams. Using the intersection amplitudes to determine the beam overlap eliminates the requirement for a position scanner, which improves the productivity and efficiency of operation.

Although the present invention has been described in relation to particular embodiments thereof, it can be appreciated that various designs can be conceived based on the teachings of the present disclosure, and all are within the scope of the present disclosure.

What is claimed is:

1. A non-destructive testing (NDT) system comprising:
   an acquisition unit configured to detect a plurality of response amplitudes of echo signals corresponding to reflections of a plurality of ultrasonic beams from a defect;
   an intersection amplitude unit configured to determine a maximum amplitude of an ultrasonic beam among the plurality of ultrasonic beams and to determine an intersection amplitude of an adjacent beam among the plurality of ultrasonic beams adjacent to the ultrasonic beam; and
   an overlap verification module configured to calculate an amplitude drop of the intersection amplitude relative to the maximum amplitude and to determine a beam overlap percentage between the ultrasonic beam and the adjacent beam according to the amplitude drop.

2. The system of claim 1, wherein the defect comprises a feature in a calibration block.

3. The system of claim 1, wherein the overlap verification module is configured to calculate the amplitude drop as a ratio of the intersection amplitude and the maximum amplitude.

4. The system of claim 1, wherein the intersection amplitude unit is further configured to determine another intersection amplitude according to the determined beam overlap percentage.

5. The system of claim 1, wherein the overlap verification module is further configured to verify the beam overlap percentage meets a predetermined threshold.

6. The system of claim 4, further comprising an overlap optimization module configured to adjust the plurality of ultrasonic beams to conform to respective beam overlap percentages meeting the predetermined threshold.

7. The overlap verification system of claim 1, wherein the beam overlap percentage is determined by interpolation.

8. The system of claim 1, further comprising a beam relevance module configured to disregard ultrasonic beams reflecting from regions outside a relevant weld inspection volume.

9. The system of claim 1, further comprising an ultrasonic probe.

10. A method comprising:
    detecting a plurality of response amplitudes of echo signals corresponding to reflections of a plurality of ultrasonic beams from a defect;
    determining a maximum amplitude of an ultrasonic beam among the plurality of ultrasonic beams;
    determining an intersection amplitude of an adjacent beam among the plurality of ultrasonic beams adjacent to the ultrasonic beam;
    calculating an amplitude drop of the intersection amplitude relative to the maximum amplitude; and determining a beam overlap percentage between the ultrasonic beam and the adjacent beam according to the amplitude drop.

11. The method of claim 10, wherein calculating an amplitude drop of the intersection amplitude relative to the maximum amplitude comprises calculating the amplitude drop as a ratio of the intersection amplitude and the maximum amplitude.

12. The method of claim 10, further comprising determining another intersection amplitude of another adjacent beam among the plurality of ultrasonic beams adjacent to the ultrasonic beam according to the beam overlap percentage.

13. The method of claim 10, further comprising verifying the beam overlap percentage meets a predetermined threshold.

14. The method of claim 13, comprising establishing the predetermined threshold using a numerical value derived from a regulatory requirement.

15. The method of claim 13, further comprising adjusting the plurality of ultrasonic beams to meet the predetermined threshold.

16. The method of claim 13, wherein determining a beam overlap percentage between the ultrasonic beam and the adjacent beam according to the amplitude drop comprises determining the beam overlap percentage by interpolation.

17. The method of claim 10, further comprising disregarding ultrasonic beams from the plurality of ultrasonic beams reflecting from regions outside a relevant weld inspection volume.

18. The method of claim 10, further comprising receiving the echo signals at an ultrasonic probe.

19. The method of claim 10, wherein the defect comprises a feature in a calibration block.

* * * * *

UNITED STATES PATENT AND TRADEMARK OFFICE
CERTIFICATE OF CORRECTION

PATENT NO. : 11,249,053 B2
APPLICATION NO. : 16/657076
DATED : February 15, 2022
INVENTOR(S) : Benoit Lepage It is certified that error appears in the above-identified patent and that said Letters Patent is hereby corrected as shown below:

In the Claims

In Column 8, Line 45, in Claim 6, delete "claim 4," and insert --claim 5,-- therefor Signed and Sealed this
Seventeenth Day of May, 2022

Katherine Kelly Vidal
*Director of the United States Patent and Trademark Office*